US012594599B2

(12) United States Patent
Garcia et al.

(10) Patent No.: US 12,594,599 B2
(45) Date of Patent: Apr. 7, 2026

(54) CUTTING TOOL

(71) Applicant: AB SANDVIK COROMANT, Sandviken (SE)

(72) Inventors: Jose Luis Garcia, Sandviken (SE); Leif Dahl, Sandviken (SE); Johnny Bruhn, Sandviken (SE); Erik Holmstrom, Sandviken (SE)

(73) Assignee: AB Sandvik Coromant, Sandviken (SE)

( * ) Notice: Subject to any disclaimer, the term of this patent is extended or adjusted under 35 U.S.C. 154(b) by 534 days.

(21) Appl. No.: 18/268,742

(22) PCT Filed: Dec. 20, 2021

(86) PCT No.: PCT/EP2021/086777
§ 371 (c)(1),
(2) Date: Jun. 21, 2023

(87) PCT Pub. No.: WO2022/136265
PCT Pub. Date: Jun. 30, 2022

(65) Prior Publication Data
US 2024/0307960 A1 Sep. 19, 2024

(30) Foreign Application Priority Data
Dec. 22, 2020 (EP) ..................................... 20216552

(51) Int. Cl.
B22F 7/06 (2006.01)
B23B 27/14 (2006.01)
(Continued)

(52) U.S. Cl.
CPC ............ B22F 7/064 (2013.01); B23B 27/148 (2013.01); B23B 27/18 (2013.01); C04B 35/52 (2013.01);
(Continued)

(58) Field of Classification Search
CPC ........ B23B 2226/125; B23B 2226/315; B23B 2240/08; B23B 27/148; B23B 27/18;
(Continued)

(56) References Cited

U.S. PATENT DOCUMENTS

| | | |
|---|---|---|
| 4,228,942 A | 10/1980 | Dietrich |
| 4,919,220 A | 4/1990 | Fuller et al. |

(Continued)

FOREIGN PATENT DOCUMENTS

| | | |
|---|---|---|
| JP | H10305630 A | 11/1998 |

OTHER PUBLICATIONS

Yin Zhiyong: "Vacuum Brazing of Diamond to Tungsten Carbide", Apr. 30, 2016. [[/ 1-124, URL:https://digitalcommons.mtech.edu/cgi/viewcontent.cgi?article=1079&context=grad_rsch.

*Primary Examiner* — Jacob J Cigna
(74) *Attorney, Agent, or Firm* — Corinne R. Gorski

(57) ABSTRACT

A cutting tool includes a supporting body and a cBN or PCD cutting edge tip attached to the supporting body via a 5-150 μm braze joint. The supporting body is cemented carbide having 3-25 wt % of a metallic binder, optionally up to 25 wt % of carbides or carbonitrides of one or more elements of group 4, 5, or 6, and the rest WC. The metallic binder includes at least 40 wt % Ni, and the braze joint has, in the order from the supporting body, a first layer of TiC situated next thereto, with an average thickness of 10-400 nm, a second layer, with an average thickness of 0.5-8 μm, having in average at least 5 wt % metallic Ni, in average 25-60 wt % metallic Cu and in average 15-45 wt % metallic Ti, and a third layer, with an average thickness of 4-145 μm, having metallic Ag and metallic Cu.

15 Claims, 2 Drawing Sheets

(51) Int. Cl.

| | |
|---|---|
| *B23B 27/18* | (2006.01) |
| *C04B 35/52* | (2006.01) |
| *C04B 35/56* | (2006.01) |
| *C04B 35/5831* | (2006.01) |
| *C04B 37/00* | (2006.01) |
| *C22C 5/08* | (2006.01) |
| *C22C 9/00* | (2006.01) |
| *C22C 32/00* | (2006.01) |

(52) U.S. Cl.

CPC ...... *C04B 35/5611* (2013.01); *C04B 35/5831* (2013.01); *C04B 37/005* (2013.01); *C04B 37/006* (2013.01); *C22C 5/08* (2013.01); *C22C 9/00* (2013.01); *C22C 32/0052* (2013.01); *C04B 2235/3843* (2013.01); *C04B 2235/427* (2013.01); *C04B 2237/083* (2013.01); *C04B 2237/124* (2013.01); *C04B 2237/125* (2013.01); *C04B 2237/361* (2013.01); *C04B 2237/363* (2013.01)

(58) Field of Classification Search

CPC ... C22C 29/08; C22C 2026/003; C22C 1/051; C22C 26/00; C22C 29/067; C22C 2026/006; C22C 2026/008; C22C 5/08; C22C 9/00; C22C 32/0052; C04B 37/025; C04B 37/026; C04B 2235/3856; C04B 2237/122; C04B 2237/123; C04B 2237/58; C04B 2237/59; C04B 35/52; C04B 35/5611; C04B 35/5831; C04B 37/005; C04B 37/006; C04B 2235/3843; C04B 2235/427; C04B 2237/083; C04B 2237/124; C04B 2237/125; C04B 2237/361; C04B 2237/363; B22F 2999/00; B22F 7/062; B22F 2005/001; B22F 7/064; B24D 3/06; B23K 2101/002; B23P 15/28

See application file for complete search history.

(56) References Cited

U.S. PATENT DOCUMENTS

| | | | |
|---|---|---|---|
| 8,999,511 B2 * | 4/2015 | Kobayashi | C04B 37/026 |
| | | | 51/307 |
| 9,649,748 B2 * | 5/2017 | Konovalov | B24D 3/06 |
| 10,428,417 B2 * | 10/2019 | Andersson | B23B 51/00 |
| 10,780,506 B2 * | 9/2020 | Hirano | C22C 29/16 |

* cited by examiner

10 μm

5 μm

CUTTING TOOL

RELATED APPLICATION DATA

This application is a § 371 National Stage Application of PCT International Application No. PCT/EP2021/086777 filed Dec. 20, 2021 with priority to EP 20216552.8 filed Dec. 22, 2020.

The present invention relates to a cutting tool comprising a supporting body and a cBN, or PCD, cutting edge tip.

INTRODUCTION

Since it was first introduced as a cutting tool material in the 1980s, the use of cubic boron nitride (cBN) has evolved to become a common machining solution. The application areas include hardened steels, cast irons, heat resistant super alloys (HRSA) and powdered metals. These workpiece materials have the thing in common that they are generally recognised as being difficult to machine. A cutting tool of a cBN material can withstand high cutting temperatures and forces and still retain its cutting edge. This is why cBN delivers long, consistent tool life and produces components with excellent surface finish.

Polycrystalline diamond (PCD) is a composite of diamond particles sintered together with a metallic binder. Diamond is the hardest, and therefore the most abrasion resistant, of all materials. As a cutting tool material, it has good wear resistance but it lacks chemical stability at high temperatures and dissolves easily in iron. PCD tools are therefore limited to non-ferrous materials, such as high-silicon aluminium, metal matrix composites (MMC) and carbon fibre reinforced plastics (CFRP). PCD with flood coolant can also be used in titanium super-finishing applications.

When used in cutting tools the cBN, or the PCD, usually only constitutes a part of the cutting tool, e.g., a cutting insert, more specifically a part engaged in the cutting operation such as a tip portion. Thus, a tip of cBN, or PCD, is attached to a supporting body of, usually, cemented carbide.

A braze material, in the form of a paste, foil or a wire, is used for bonding a cBN tip, or a PCD tip, to a supporting body of cemented carbide. The aim is to provide a strong bond between the supporting body and the cBN tip, or PCD tip.

The cemented carbide supporting body constitutes hard grains of WC in a metallic binder. One type of binder is based on Ni as a main component.

OBJECT OF THE INVENTION

It is an object of the present invention to provide a cutting tool having a cBN cutting edge tip, or a PCD cutting edge tip, brazed to a supporting body of cemented carbide with a metallic binder comprising at least 40 wt % Ni, wherein the cutting edge tip is brazed via a new braze joint which provides excellent bonding strength leading to long tool life.

By "cutting tool" is herein meant a cutting tool for metal cutting applications such as an insert or an end mill. The metal cutting application areas is suitably turning or milling.

THE INVENTION

The cutting tool according to the invention comprises a supporting body and a cBN, or PCD, cutting edge tip, wherein the cBN, or PCD, cutting edge tip is attached to the supporting body via a 5-150 µm thick braze joint, the supporting body is of cemented carbide comprising 3-25 wt % of a metallic binder, optionally up to 25 wt % of carbides or carbonitrides of one or more elements of group 4, 5, or 6 in the periodic table of elements, and rest WC, wherein the metallic binder comprises at least 40 wt % Ni, and wherein said braze joint comprises, in the order from the supporting body, a first layer of TiC situated next to the supporting body with an average thickness of 10-400 nm, a second layer, with an average thickness of 0.5-8 µm, comprising in average at least 5 wt % metallic Ni, in average 25-60 wt % metallic Cu and in average 15-45 wt % metallic Ti, and a third layer, with an average thickness of 4-145 µm, comprising metallic Ag and metallic Cu.

The thicknesses of the braze joint or a layer within the joint is herein measured in a direction perpendicular to the interface between the supporting body and the braze joint.

The average thickness of the braze joint or a layer within the braze joint is suitably calculated by using one or more cross sectional images of the braze joint and taking at least 10 randomly selected points of measurement spread over a distance of at least 30 µm, and calculating an average.

By "cBN cutting edge tip" is herein meant a cutting edge tip of a cBN composite material comprising cBN grains and a metallic and/or ceramic binder phase comprising, for example, one or more aluminum compounds. The cBN composite material may also comprise a ceramic binder phase, which may comprise, for example, a nitride, carbide or carbonitride of a Group 4, 5 or 6 transition metal or mixtures thereof. The transition metal may, for example, be titanium. By varying the components and the relative amounts of the components, cBN composite materials can be designed for optimum performance in different applications, e.g. continuous or interrupted cutting, and in machining of different metals. Known methods for manufacturing a cBN composite material for metal machining are based on conventional powder metallurgical techniques, which include mixing and milling the raw materials to a powder mixture, forming the powder mixture to a green body and subjecting the green body to a sintering operation at high pressure and high temperature (HPHT sintering) to form a sintered body of a cBN composite material. The sintered body of a cBN composite material can either be formed on a support material of, for example, cemented carbide, or be formed without a support material. The sintered body of a cBN composite material is cut into a tip intended to be brazed to a cemented carbide substrate.

By "PCD cutting edge tip" is herein meant a cutting edge tip of a PCD composite material comprising diamond particles sintered together with a metallic binder, usually Co. The content of diamond particles is suitably at least 80 vol %. The sintered body of a PCD composite material can either be formed on a support material of, for example, cemented carbide, or be formed without a support material. The sintered body of a PCD composite material is cut into a tip intended to be brazed to a cemented carbide substrate.

By "cemented carbide" is herein meant a sintered material comprising at least 75 wt % hard constituents distributed in a continuous metallic binder phase. The cemented carbide comprises at least 50 wt % WC, possibly other hard constituents common in the art of making cemented carbides, such as carbides and/or carbonitrides of elements of group 4, 5 and 6 in the periodic table of elements, and a metallic binder. The metallic binder of the cemented carbide can comprise elements that are dissolved in the metallic binder during sintering, such as W and C originating from the WC.

By "metallic Ni", "metallic Cu", "metallic Ag", "metallic Ti", and "metallic In" is herein understood that each of the metal elements Ni, Cu, Ag, Ti and In are in a metallic bond with the same or another metal, i.e., valence electrons are moving freely through a metal lattice.

By braze joint is herein meant the area or mass between the cemented carbide part and the cBN, or PCD, cutting edge tip that is filled by a braze material and formed during a brazing process.

The metallic binder in the cemented carbide of the supporting body suitably comprises 50-90 wt % Ni, preferably 60-80 wt % Ni.

In one embodiment the metallic binder in the cemented carbide of the supporting body comprises 10-20 wt % Fe.

In one embodiment the metallic binder in the cemented carbide of the supporting body comprises up to 10 wt % Co.

In one embodiment the metallic binder in the cemented carbide of the supporting body comprises 0.1-5 wt % Co.

In one embodiment the metallic binder in the cemented carbide of the supporting body comprises <1 wt % Co.

The metallic binder of the cemented carbide further comprises W originating from the WC that are dissolved in the metallic binder during sintering. The content of W dissolved in the metallic binder depends on the carbon content in the cemented carbide and the content of W in the metallic binder is suitably less than 20 wt %.

In one embodiment Cr and/or V is present as dissolved in the metallic binder

Other elements such as Cu and Mn may be present along with Fe in the metallic binder.

In one embodiment the sum of contents of Ni, Fe, Co, and W in the metallic binder phase is 80-100 wt %, suitably 90-99 wt %.

The content of the metallic binder in the cemented carbide of the supporting body is suitably 4-20 wt %, preferably 5-15 wt %.

The thickness of the braze joint is suitably 10-100 μm, preferably 10-50 μm.

During brazing Ti from the braze material will react with carbon from the cemented carbide supporting body and form a TiC layer next to the supporting body. The average thickness of the first layer of TiC is suitably 50-300, preferably 100-300 nm.

In one embodiment, the braze joint comprises a TiN layer next to the cBN cutting edge tip. The average thickness of the TiN layer is suitably 10-400 nm, preferably 50-300 nm.

In one embodiment, the braze joint comprises a TiC layer next to the PCD cutting edge tip. The average thickness of this TiC layer is suitably 10-400 nm, preferably 50-300 nm.

The second layer suitably comprises in average at least 10 wt % metallic Ni, preferably in average 10-40 wt % metallic Ni, most preferably in average 15-30 wt % metallic Ni.

The second layer suitably comprises in average 35-55 wt % metallic Cu.

The second layer suitably comprises in average 25-40 wt % metallic Ti.

The second layer suitably has a sum of metallic Ni, metallic Cu and metallic Ti of in average 70-100 wt %, preferably in average 80-100 wt %, most preferably in average 90-100 wt %.

The average thickness of the second layer is suitably 1-5 μm.

In one embodiment the braze joint further comprises metallic In (Indium) in the third layer.

The third layer suitably has a sum of metallic Cu and metallic Ag of in average 60-100 wt %, preferably in average 80-100 wt %, most preferably in average 90-100 wt %.

The third layer, comprising metallic Ag and metallic Cu suitably comprises in average 60-80 wt % metallic Ag and in average 15-40 wt % metallic Cu.

In one embodiment In is present in a phase comprised in the third layer comprising 80-95 wt % Ag.

In one embodiment the third layer comprises two phases, one which contains in average 30-50 wt % metallic Cu and in average 50-70 wt % metallic Ag, and one phase that contains in average 5-20 wt % metallic Cu and in average 80-95 wt % metallic Ag.

The average thickness of the third layer is suitably 8-100 μm, preferably 12-50 μm.

In one embodiment, there is a Ni depleted zone in an outermost portion of the supporting body next to the braze joint, the Ni depleted zone has preferably an average thickness of 0.5-5 μm.

In one embodiment the cBN cutting edge tip comprises a lower part of cemented carbide and an upper part of a cBN composite material In one embodiment the cBN cutting edge tip comprises a cBN composite material as a whole.

In one embodiment the PCD cutting edge tip comprises a lower part of cemented carbide and an upper part of a PCD composite material In one embodiment the PCD cutting edge tip comprises a PCD composite material as a whole.

The cutting tool can be a turning insert, a milling insert, or an endmill.

The cutting tool of the present invention is suitably made by providing a cemented carbide sintered body ("blank") in the form of a cutting insert or an endmill, and also providing a cutting edge tip of cBN, or PCD. The cemented carbide blank having a recess into which the cBN, or PCD, cutting edge tip is intended to be joined.

A braze material, in the form of a paste, comprising Ag, Cu and Ti, is applied on one or both of the recess of the cemented carbide blank and the cBN, or PCD, cutting edge tip and the cemented carbide blank and the cBN, or PCD, cutting edge tip is then put together with the braze material situated in between the two parts. This forms a joint cutting tool body. Indium (In) may also be included in the braze material, especially if the brazing is about to be performed at a lower temperature than 780° C., since In lowers the melting temperature of the braze material.

The joint cutting tool body is then subjected to a heat treatment under inert atmosphere such as Argon or under vacuum. The temperature is held at about 800° C. when brazing a cBN cutting edge tip and typically at about 700° C. when brazing a PCD cutting edge tip.

The duration of the heat treatment is from about 5 to about 15 minutes. This treatment forms a cutting tool having a strong braze joint between the cemented carbide blank and the cBN, or PCD, cutting edge tip.

In the brazing process a certain temperature range is needed in order to provide the specific braze joint between the cemented carbide supporting body and the cBN, or PCD, cutting edge tip of the present invention. During brazing Ti from the braze material will react with the carbon in the cemented carbide part and form a TiC layer at the interface between the braze joint and the cemented carbide part. If a too low temperature is used no TiC layer next to the cemented carbide body is formed and also the layer formed comprising Ni becomes very irregular. This will give a low strength of the joint between the cemented carbide body and the cBN, or PCD, cutting edge tip. On the other hand, if a too high temperature is used in the brazing process the TiC layer becomes excessive thick which makes the TiC layer too brittle and less functional as a bonding layer.

DETAILED DESCRIPTION OF EMBODIMENTS IN DRAWINGS

Figure 1:
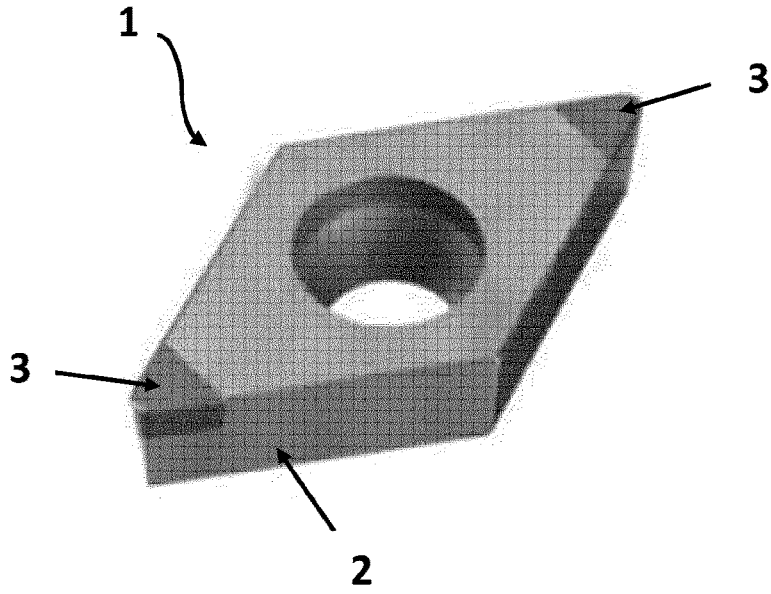
FIG. 1 is a general view of a cutting tool being a turning insert having a supporting body part and a cBN/PCD cutting edge tip.

FIG. 1 shows a general view of a cutting tool (1) being a turning insert having a supporting body (2) and cBN/PCD cutting edge tips (3).

Figure 2:
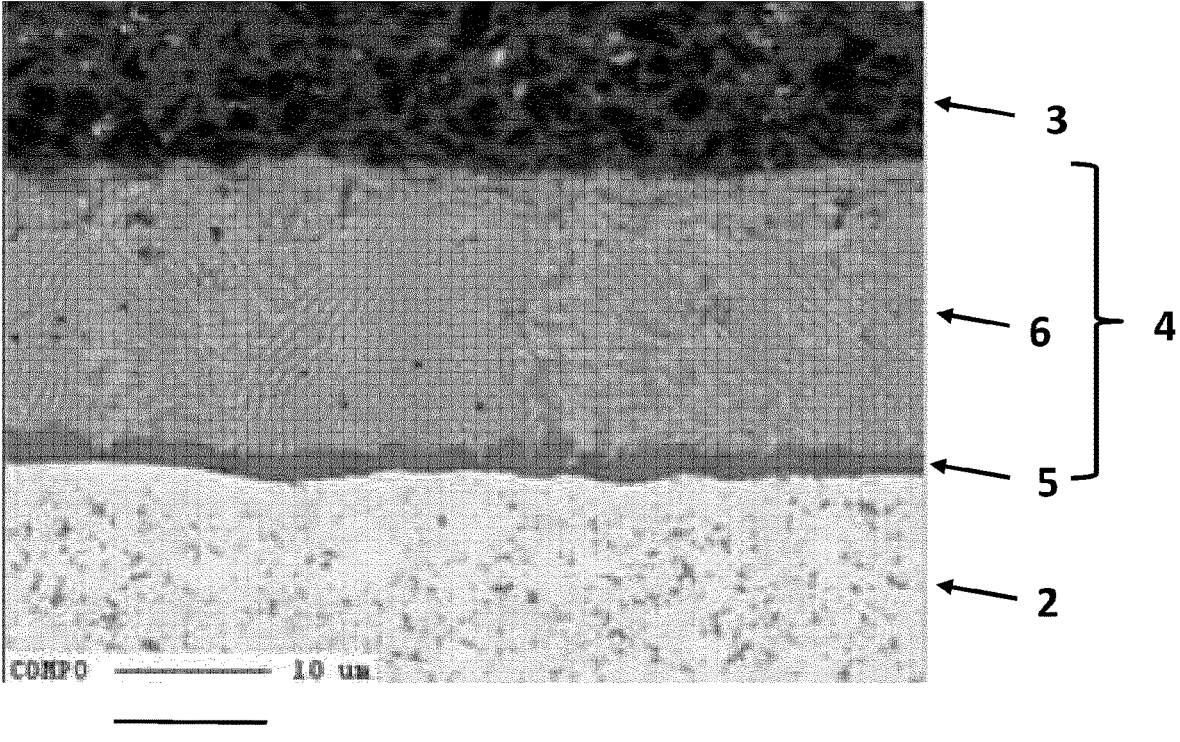
FIG. 2 shows a cross section of a cutting tool with braze joint joining a supporting body and a cBN cutting edge tip.

FIG. 2 shows a SEM image of a cross section of an embodiment of a cutting tool of the present invention having a braze joint (4) joining a cemented carbide supporting body (2) and a cBN cutting edge tip (3). The braze joint (4) comprises a layer (5) which comprises Ni, Cu and Ti and a layer (6) which comprises Ag and Cu.

Figure 3:
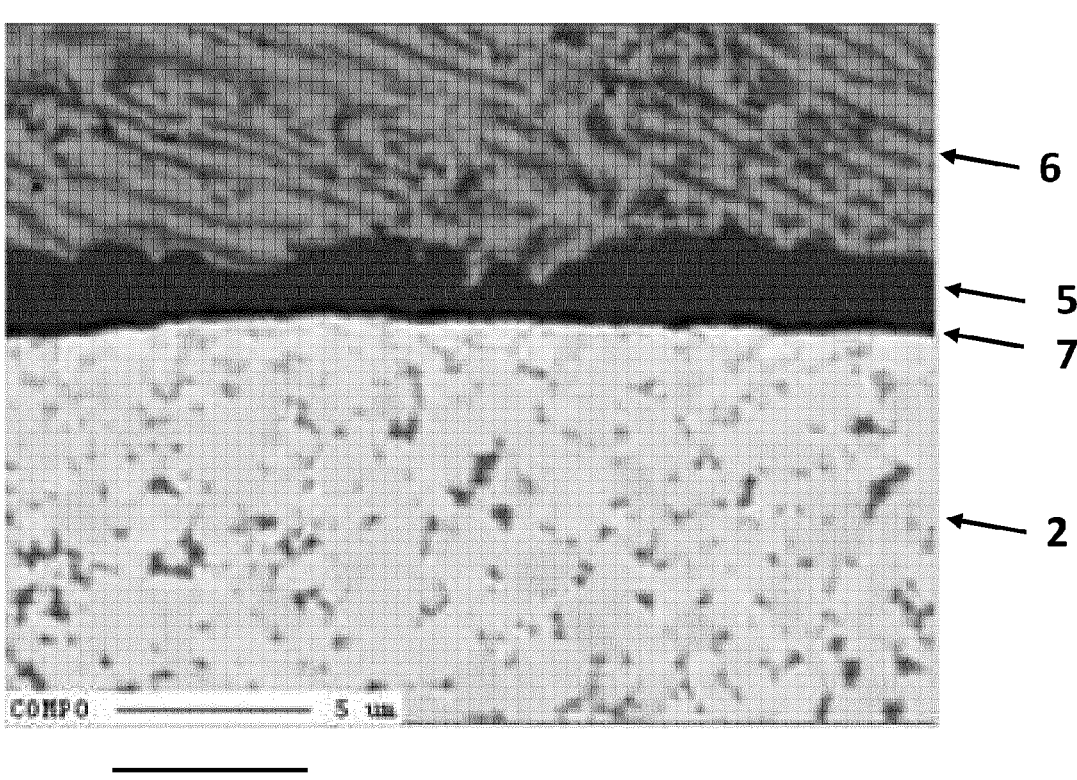
FIG. 3 shows an enlarged part of FIG. 2.

FIG. 3 shows a SEM image which is an enlarged section of FIG. 2 showing the cemented carbide supporting body (2) and a lower part of the braze joint where a lowermost first layer (7) of TiC is seen next to the cemented carbide supporting body (2). Further a second layer (5) comprising Ni, Cu and Ti is seen and the lower part of a third layer (6) comprising Ag and Cu.

EXAMPLES

Exemplifying embodiments of the present invention will now be disclosed in more detail. Cutting tools (inserts) were prepared, analysed and tested in a metal cutting operation.

Example 1—Manufacture of Cutting Tool Samples

Cemented carbide cutting insert blanks were manufactured from a powder mixture with a composition of 4.89 wt % Ni, 0.83 wt % Fe, and balance WC. The powder mixture was milled using milling bodies of WC—Co based cemented carbide, dried, pressed into an insert geometry DCGW11T308 and sintered at 1410° C.

The binder content in the cemented carbide was confirmed to be about 6.1 wt %. The sintered cemented carbide comprised about 4.9 wt % Ni, 0.8 wt % Fe and 0.4 wt % Co, being parts of the metallic binder phase. The metallic binder phase itself comprised about 75 wt % Ni, 13 wt % Fe, 3 wt % Co and 9 wt % W. The W dissolved originated from the WC grains. The Co originated mainly from milling bodies of WC—Co based cemented carbide that were worn during the milling of the raw material powder mixture. No free graphite or eta phase was visible in a SEM micrograph of a cross section of the cemented carbide substrates.

A recess, intended for a cBN tip, at the tip portion of the cutting insert blanks was made. The cutting insert blanks now forms supporting bodies for cBN cutting tips. Cutting edge tips of cBN of two types were provided. The first type (cBN 1) had been manufactured from a powder mixture of cBN and TiN which was pressed into cutting edge tips of geometry S01020 and sintered. The sintered blanks contained 47 vol % cBN balanced with TiN+small amounts of reaction products. The second type (cBN 2) had been manufactured from a powder mixture of cBN and TiCN which was pressed into cutting edge tips of geometry S01020 and sintered. The sintered blanks contained 65 vol % cBN balanced with TiCN+small amounts of reaction products. The cBN 1 and cBN 2 cutting edge tips were available commercially on the market.

The joining of a cutting edge tip of cBN and a cutting insert blank was then made by applying a braze paste onto the cemented carbide supporting body, on the surface of the recess of the cutting insert blank. Two different braze pastes were used, respectively. The first braze paste ("TB629" from Tokyo Braze Co. Ltd.) had a composition of $Ag_{59}Cu_{27}In_{13}Ti_1$) and the second braze paste ("TB608" from Tokyo Braze Co. Ltd.) had a composition of $Ag_{70}Cu_{28}Ti_2$.

The brazing was made in a furnace at three different temperatures, 740° C., 820° C. and 900° C. The brazing processes at 740° C. and 820° C. were made in an Ipsen VFC-124 batch furnace under vacuum while the brazing process at 900° C. was made in a Tokyo Braze continuous belt furnace with Argon as protecting gas. In the brazing processes at 740° C. and 900° C. the first braze paste was used while in the brazing process at 820° C. the second braze paste was used. There was also a slight difference in process time between the processes at 740° C. and 820° C., on one hand, and the process at 900° C. on the other hand.

Three different brazing processes are thus defined:

TABLE 1

| Process | Atmosphere | Temperature | Process time |
|---------|-----------|-------------|--------------|
| 1 | Vacuum, $10^{-5}$ mbar | 740° C. | 10 minutes |
| 2 | Vacuum, $10^{-5}$ mbar | 820° C. | 10 minutes |
| 3 | Argon | 900° C. | 12 minutes |

The final cutting insert geometry was DCGW 11 T308S01020. After the brazing process is completed a final grinding of the joint assembly of the supporting body and the cBN cutting tip is made.

Some of the assemblies of a supporting body and a second type of cBN cutting edge tip were coated with a 2-4 μm thick layer of TiN according to a commonly PVD process used in the field of cutting tools. The deposition temperature of the TiN was sufficiently low (about 450° C.) so the deposition of the TiN coating did not affect the properties of the braze joint in any way.

Table 2 summarises the constitution of the samples and the brazing process used when producing them.

TABLE 2

| Sample | cBN type | Braze paste | Atmosphere | Temperature | Process time |
|--------|----------|-------------|-----------|-------------|--------------|
| Sample 1 | 1 | 1 | Vacuum, $10^{-5}$ mbar | 740° C. | 10 minutes |
| Sample 2 | 1 | 2 | Vacuum, $10^{-5}$ mbar | 820° C. | 10 minutes |
| Sample 3 | 1 | 1 | Argon | 900° C. | 12 minutes |
| Sample 4 (TiN-coated Sample 1) | 1 | 1 | Vacuum, $10^{-5}$ mbar | 740° C. | 10 minutes |
| Sample 5 (TiN-coated Sample 2) | 1 | 2 | Vacuum, $10^{-5}$ mbar | 820° C. | 10 minutes |
| Sample 6 (TiN-coated Sample 3) | 1 | 1 | Argon | 900° C. | 12 minutes |
| Sample 7 | 2 | 1 | Vacuum, $10^{-5}$ mbar | 740° C. | 10 minutes |

TABLE 2-continued

| Sample | cBN type | Braze paste | Atmosphere | Temperature | Process time |
|---|---|---|---|---|---|
| Sample 8 | 2 | 2 | Vacuum, $10^{-5}$ mbar | 820° C. | 10 minutes |
| Sample 9 | 2 | 1 | Argon | 900° C. | 12 minutes |

Example 2—Analysis on Braze Joints

The braze joint was analysed using electron probe micro-analyzer (EPMA). FIGS. 2-3 show SEM images where a backscattered electron (BSE) detector has been used. This detector resolves elements by means of atomic weight in that lighter materials appear dark and heavy ones appear bright. For example, Ag appears very bright versus Cu.

The layered structure of the braze joint was also analysed by wave-length dispersive spectroscopy (WDS) using EPMA. EPMA instrument used was JEOL JXA-8530 F Hyperprobe. This provided different images for different elements so that the presence of a certain element (such as Ni, Ti, Cu, Ag, In, C) at a certain position in the braze joint could be visualised as well as an indication of level of its content by the intensity of the signal.

The content of a certain element (metallic Ni, Ti, Cu, Ag, and In) in a layer was analysed by using energy dispersive X-ray spectroscopy (EDS) equipped in an EPMA. EPMA instrument used was JEOL JXA-8530 F Hyperprobe. A number of randomly selected measuring points were selected in order to obtain a reliable average value.

Analysis were made on the braze joint of samples Sample 1, Sample 2 and Sample 3. Clear layers 1, 2 and 3 were seen. Table 3 shows the element contents in each layer and the average thickness of each layer.

The thickness of the TiC layer is suitably measured by considering the thickness of a concentration of C next to the cemented carbide supporting body in combination with the presence of TiN. However, this is suitably made in combination with an SEM-BSE image obtain as described above where the TiC layer will be clearly seen.

For Sample 1 brazed at 740° C. it is seen from analysis that:

No visible C next to the cemented carbide as well as Ti. However a very thin layer comprising the element Ti is seen. A clear thin layer is seen in a SEM-BSE image. Thus, a very thin first layer of TiC is present.

The second layer contains substantial amounts of Ni, Cu and Ti. However, the layer is very inhomogeneous, comprising several phases and poorly defined.

No Ni depleted zone in the uppermost part of the cemented carbide is seen.

For Sample 2 brazed at 820° C. it is seen from analysis that:

C is clearly visible next to the cemented carbide, as well as Ti. A clear layer is seen in a SEM-BSE image. Thus, a first layer of TiC is present.

The second layer containing substantial amounts of Ni, Cu and Ti and is well defined.

A Ni depleted zone in the uppermost about 1 μm of the cemented carbide is seen.

For Sample 3 brazed at 900° C. it is seen from analysis that:

C is clearly visible next to the cemented carbide, as well as Ti. A clear layer is seen in a SEM-BSE image. Thus, a first layer of TiC is present.

The second layer containing substantial amounts of Ni, Cu and Ti and is well defined.

A Ni depleted zone in the uppermost about 2 μm of the cemented carbide is seen.

Table 3 shows further results from analysis.

TABLE 3

| Sample | Layer 1, closest to cemented carbide | Layer 2 | Layer 3 | Whole braze joint |
|---|---|---|---|---|
| Sample 1 (740° C.) | TiC | Ni*: — wt %<br>Cu*: — wt %<br>Ti*: — wt % | Cu**: —<br>Ag**: —<br>In**: —<br>Cu + Ag > 90 wt % | |
| Sample 1 Thickness of layers | 125 nm | ≈2 μm* | ≈27 μm | 29 μm |
| Sample 2 (820° C.) | TiC | Ni: 20 wt %<br>Cu: 47 wt %<br>Ti: 31 wt % | Cu**: —<br>Ag**: —<br>Cu + Ag ≈ 100 wt %<br>phase 1:<br>Cu: 41 wt %<br>Ag: 59 wt %<br>phase 2:<br>Cu: 10 wt %<br>Ag: 90 wt % | |
| Sample 2 Thickness of layers | 250 nm | 1.7 μm | 18 μm | 20 μm |
| Sample 3 (900° C.) | TiC | Ni*: —<br>Cu*: —<br>Ti*: — | Cu**: —<br>Ag**: —<br>In**: —<br>Cu + Ag > 90 wt %<br>phase 1:<br>Cu: 94 wt %<br>Ag: 6 wt %<br>phase 2:<br>Cu: 8 wt %<br>Ag: 88 wt % | |
| Sample 3 Thickness of layers | 300 nm | 2 μm | 17 μm | 19 μm |

*several phases, poorly defined layer, difficult to measure average metallic element content and layer thickness
**the metallic element present but in several phases, difficult to measure average content

Example 3—Cutting Tests with Samples

Cutting tools were tested in a metal cutting operation. The samples tested were Sample 5 and Sample 8, i.e., cBN cutting edge tips of different composition, braze paste 2, brazing in vacuum at a temperature 820° C. for 10 minutes. The test method comprised interrupted cuts in hardened steel. A ring of through-hardened steel SS2258 is provided, having a slot prepared in the soft stage in order to provide an interrupted cut. The test method includes a turning operation by running facing cuts on the slotted part, until edge breakage. The cutting parameters are stepped-up per cut taken to give an incremental load. The test method gives a good view of the cutting tool performance in severe cutting, including a judgement of the solidity of its braze joint.

The cutting data used are seen in Table 4. Feed (fn) and depth of cut (ap) are set to the same value. Recommended start values for fn and ap depend on the insert style and grade to be tested. The cutting speed (vc) was 120 m/min.

TABLE 4

| | Feed (fn) start | Depth of cut (ap) start | Increment fn | Increment ap | No. of edges tested |
|---|---|---|---|---|---|
| Sample 5 | 0.16 | 0.16 | 0.02 per pass | 0.02 per pass | 4 |
| Sample 8 | 0.2 | 0.2 | 0.02 per pass | 0.02 per pass | 3 |

The test was run until edge failure (checked under optical microscope after each pass), and the test result is reported as the feed/depth of cut (or number of passes) at which the edge fails.

For each pass, the values for fn and ap were incremented by 0.02.

A number of edges were tested in order to get reliable results.

TABLE 5

| | Feed at failure(fn) | Number of passes to failure (average) |
|---|---|---|
| Sample 5 | — | 6.8 (Vacuum) |
| | 0.29 (Vacuum) | 3.2 (Argon) |
| | 0.22 (Argon) | |
| Sample 8 | 0.4 | 10 |

For the samples, the results showed that all failures occurred in the cBN material with an expected size of failures. There were no signs that the braze would be the weakest link. Thus, it is concluded that the braze joint of the present invention performs very well. It must further be noted that the loads used in this test method were significantly higher than what is application relevant in a normal metal machining operation of hardened steel, so all samples tested would perform very well in an application in the industry.

The invention claimed is:

1. A cutting tool comprising:
a supporting body; and
a cBN or PCD cutting edge tip, wherein the cBN or PCD cutting edge tip is attached to the supporting body via a 5-150 μm thick braze joint, the supporting body being cemented carbide including 3-25 wt % of a metallic binder, optionally up to 25 wt % of carbides or carbonitrides of one or more elements of group 4, 5, or 6 in the periodic table of elements, and the rest WC, wherein the metallic binder includes at least 40 wt % Ni, and wherein said braze joint includes, in order from the supporting body, a first layer of TiC situated next to the supporting body with an average thickness of 10-400 nm, a second layer, with an average thickness of 0.5-8 μm, including in average at least 5 wt % metallic Ni, in average 25-60 wt % metallic Cu and in average 15-45 wt % metallic Ti, and a third layer, with an average thickness of 4-145 μm, including metallic Ag and metallic Cu.

2. The cutting tool according to claim 1, wherein the metallic binder in the cemented carbide of the supporting body includes 50-90 wt % Ni.

3. The cutting tool according to claim 1, wherein the metallic binder in the cemented carbide of the supporting body includes 10-20 wt % Fe.

4. The cutting tool according to claim 1, wherein the thickness of the braze joint is 10-100 μm.

5. The cutting tool according to claim 1, wherein the average thickness of the first layer of TiC is 50-300 nm.

6. The cutting tool according to claim 1, wherein the second layer includes in average 10-40 wt % metallic Ni.

7. The cutting tool according to claim 1, wherein the second layer includes in average 35-55 wt % metallic Cu.

8. The cutting tool according to claim 1, wherein the second layer includes in average 25-40 wt % metallic Ti.

9. The cutting tool according to claim 1, wherein the average thickness of the second layer is 1-5 μm.

10. The cutting tool according to claim 1, wherein the second layer has a sum of metallic Ni, metallic Cu and metallic Ti of in average 70-100 wt %.

11. The cutting tool according to claim 1, wherein the third layer includes metallic In.

12. The cutting tool according to claim 1, wherein the third layer has a sum of metallic Cu and metallic Ag of in average 60-100 wt %.

13. The cutting tool according to claim 1, wherein the third layer includes in average 60-80 wt % metallic Ag and in average 15-40 wt % metallic Cu.

14. The cutting tool according to claim 1, wherein there is a Ni depleted zone in an outermost portion of the supporting body next to the braze joint, the Ni depleted zone having an average thickness of 0.5-5 μm.

15. The cutting tool according to claim 1, wherein the tool is a turning insert, a milling insert, or an endmill.

* * * * *